US010279802B2

(12) United States Patent
Matsubara et al.

(10) Patent No.: US 10,279,802 B2
(45) Date of Patent: May 7, 2019

(54) DRIVE APPARATUS AND AUTOMOBILE

(71) Applicant: TOYOTA JIDOSHA KABUSHIKI KAISHA, Toyota-shi, Aichi-ken (JP)

(72) Inventors: Kiyotaka Matsubara, Ichinomiya (JP); Kenji Yamada, Komaki (JP); Toshihiro Yamamoto, Toyohashi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/708,342

(22) Filed: Sep. 19, 2017

(65) Prior Publication Data

US 2018/0105163 A1  Apr. 19, 2018

(30) Foreign Application Priority Data

Oct. 19, 2016 (JP) ................................ 2016-205428

(51) Int. Cl.
*B60W 20/40* (2016.01)
*H02P 6/04* (2016.01)
(Continued)

(52) U.S. Cl.
CPC ............ *B60W 20/40* (2013.01); *B60K 6/445* (2013.01); *B60L 11/02* (2013.01); *B60W 10/06* (2013.01);
(Continued)

(58) Field of Classification Search
USPC ........................................................ 701/22
See application file for complete search history.

(56) References Cited

U.S. PATENT DOCUMENTS 8,583,265 B1 * 11/2013 Schulz ...................... H02P 6/10
318/400.14
2004/0160201 A1 * 8/2004 Rahman ................... H02P 5/74
318/41
(Continued)

FOREIGN PATENT DOCUMENTS

JP  2013-162660  8/2013
JP  2013-215041  10/2013
(Continued)

OTHER PUBLICATIONS

U.S. Appl. No. 15/496,236, "Vehicle", filed Apr. 25, 2017.
U.S. Appl. No. 15/493,254, "Vehicle", filed Apr. 21, 2017.

*Primary Examiner* — Tyler D Paige
(74) *Attorney, Agent, or Firm* — Finnegan, Henderson, Farabow, Garrett & Dunner, LLP

(57) ABSTRACT

As a control of an inverter, a first pulse width modulation control switches a plurality of switching elements by generating a first pulse width modulation signal of the switching elements, and a second pulse width modulation control switches the switching elements by generating a second pulse width modulation signal of the switching elements based on a voltage modulation rate, a voltage phase, and the number of pulses per unit cycle of an electrical angle of the motor based on the torque command and has a smaller number of switchings of the switching elements than the first pulse width modulation control. The first pulse width modulation control and the second pulse width modulation control are executed in a switched manner. Execution of the second pulse width modulation control as the control of the inverter is restricted when the quietness is needed, compared with when the quietness is not needed.

9 Claims, 9 Drawing Sheets

(51) Int. Cl.
  *H02P 6/28* (2016.01)
  *B60W 10/06* (2006.01)
  *B60W 10/08* (2006.01)
  *H02P 27/08* (2006.01)
  *B60K 6/445* (2007.10)
  *B60L 11/02* (2006.01)
  *B60W 20/17* (2016.01)

(52) U.S. Cl.
  CPC ............ *B60W 10/08* (2013.01); *B60W 20/17* (2016.01); *H02P 6/04* (2013.01); *H02P 6/28* (2016.02); *H02P 27/085* (2013.01); *B60W 2550/20* (2013.01); *B60W 2560/00* (2013.01); *B60W 2710/08* (2013.01); *Y10S 903/906* (2013.01)

(56) References Cited

U.S. PATENT DOCUMENTS

| | | | | |
|---|---|---|---|---|
| 2010/0027305 A1* | 2/2010 | Oyobe | ................ | B60L 3/0061 363/131 |
| 2011/0172859 A1* | 7/2011 | Sankaran | ............... | B60L 15/02 701/22 |
| 2011/0204851 A1* | 8/2011 | Manotas, Jr. | ....... | B60L 11/1816 320/128 |
| 2013/0026955 A1* | 1/2013 | Kikunaga | ............. | H02P 27/085 318/51 |
| 2013/0049666 A1* | 2/2013 | Osugi | .................... | H02M 1/44 318/503 |
| 2013/0200830 A1 | 8/2013 | Suzuki et al. | | |
| 2013/0317630 A1* | 11/2013 | Schulz | ................... | H02P 23/04 700/73 |
| 2014/0265975 A1* | 9/2014 | Holmes | .................. | B60L 15/20 318/452 |
| 2015/0015248 A1* | 1/2015 | Seo | ...................... | G01R 15/245 324/244.1 |
| 2015/0306962 A1* | 10/2015 | Ransom | ................. | H02M 1/15 318/503 |
| 2018/0105064 A1* | 4/2018 | Matsubara | ............. | B60L 15/20 |

FOREIGN PATENT DOCUMENTS

| | | |
|---|---|---|
| JP | 2015-53824 | 3/2015 |
| JP | 2016-5368 | 1/2016 |
| JP | 2016-5378 | 1/2016 |
| JP | 5986595 | 8/2016 |
| WO | WO 2015/125586 A1 | 8/2015 |

* cited by examiner

DRIVE APPARATUS AND AUTOMOBILE

INCORPORATION BY REFERENCE

The disclosure of Japanese Patent Application No. 2016-205428 filed on Oct. 19, 2016 including the specification, drawings and abstract is incorporated herein by reference in its entirety.

BACKGROUND

1. Technical Field

The present disclosure relates to a drive apparatus and an automobile, and specifically relates to a drive apparatus including a motor, an inverter, and an electricity storing device and an automobile in which the drive apparatus is mounted.

2. Description of Related Art

In the related art, suggested is a drive apparatus that includes an electric motor and an electric power converting device having an inverter circuit that drives the electric motor by switching of a plurality of switching elements. In the drive apparatus, switching of the switching elements is performed by generating pulse signals of the switching elements based on the number of pulses of one electric cycle of the electric motor and the modulation rate of a voltage and a voltage phase that are based on a torque command of the electric motor (refer to, for example, Japanese Unexamined Patent Application Publication No. 2013-162660 (JP 2013-162660 A)). Loss in the drive apparatus as a whole is decreased by generating the pulse signals in the drive apparatus such that electric power loss in the electric power converting device and the electric motor is minimized based on the number of pulses, the modulation rate, and the voltage phase.

SUMMARY

The method of generating and outputting the pulse signals to the electric power converting device in the drive apparatus is considered to have a smaller number of switchings of the switching elements than a method of generating and outputting the pulse signals to the electric power converting device by comparing a voltage command of each of the phases of the electric motor with a carrier wave voltage. However, when the number of switchings of the switching elements is small, noise (electromagnetic noise) due to switching of the switching elements is likely to be significant. Thus, quietness when needed may not be satisfied.

The present disclosure provides a drive apparatus and an automobile more sufficiently satisfying a need for quietness.

Aspects of the present disclosure are as follows.

A first aspect of the present disclosure relates to a drive apparatus including a motor, an inverter configured to drive the motor by switching of a plurality of switching elements, an electricity storing device configured to exchange electric power with the motor through the inverter, and an electronic control unit. The electronic control unit controls the inverter by switching between a first pulse width modulation (PWM) control and a second PWM control. The first PWM control switches the switching elements by generating a first PWM signal of the switching elements by comparison of a voltage command of each phase based on a torque command of the motor with a carrier wave voltage. The second PWM control switches the switching elements by generating a second PWM signal of the switching elements based on a voltage modulation rate, a voltage phase, and the number of pulses per unit cycle of an electrical angle of the motor based on the torque command. The number of switchings of the switching elements in the second PWM control is smaller than the number of switchings of the switching elements in the first PWM control. When quietness is needed in the drive apparatus, execution of the second PWM control as the control of the inverter is restricted, compared with when the quietness is not needed.

The drive apparatus according to the first aspect executes the first PWM control and the second PWM control in a switched manner as the control of the inverter. The first PWM control switches the switching elements by generating the first PWM signal of the switching elements by comparison of the voltage command of each phase based on the torque command of the motor with the carrier wave voltage. The second PWM control switches the switching elements by generating the second PWM signal of the switching elements based on the voltage modulation rate, the voltage phase, and the number of pulses per unit cycle of the electrical angle of the motor based on the torque command. The second PWM control has a smaller number of switchings of the switching elements than the first PWM control. When the quietness is needed, execution of the second PWM control as the control of the inverter is restricted, compared with when the quietness is not needed. The second PWM control has a smaller number of switchings of the switching elements than the first PWM control and thus, is likely to have more significant noise (electromagnetic noise) due to switching of the switching elements. Accordingly, when the quietness is needed, execution of the second PWM control as the control of the inverter is restricted, compared with when the quietness is not needed. Thus, a need for the quietness can be more sufficiently satisfied. Examples of "restricting execution of the second PWM control" include reducing an execution region of the second PWM control and preventing execution of the second PWM control.

In the drive apparatus according to the first aspect, the electronic control unit may permit execution of the second PWM control as the control of the inverter when the quietness is not needed, and prevent execution of the second PWM control as the control of the inverter when the quietness is needed. By doing so, a determination as to whether or not to execute or prevent the second PWM control can be made in accordance with whether or not the quietness is needed. In this case, the electronic control unit may execute the second PWM control as the control of the inverter when execution of the second PWM control as the control of the inverter is permitted with a target operating point of the motor being within a predetermined region, and execute the first PWM control as the control of the inverter when execution of the second PWM control as the control of the inverter is permitted with the target operating point being outside the predetermined region, and when execution of the second PWM control as the control of the inverter is prevented. By doing so, a determination can be made as to whether execution of the second PWM control is permitted or prevented and which of the first PWM control and the second PWM control is to be executed as the control of the inverter in accordance with the target operating point of the motor.

In the drive apparatus according to the first aspect, the second PWM control may generate the second PWM signal of the switching elements such that a harmonic component of a desired order is reduced and that total loss of loss in the motor and loss in the inverter is reduced, compared with the first PWM control. By doing so, a reduction in the harmonic component of the desired order and a reduction in the total loss can be achieved when the second PWM control is executed, compared with when the first PWM control is executed. The "desired order" may be a specific order or may be a comparatively wide range of orders of a low order to a high order.

A second aspect of the present disclosure relates to an automobile including the drive apparatus according to the aspect and drive wheels driven by being connected to the motor. The electronic control unit is configured to determine that the quietness is needed, when a vehicle speed of the automobile is lower than or equal to a predetermined vehicle speed. When the vehicle speed is comparatively low, road noise is smaller than when the vehicle speed is comparatively high, and electromagnetic noise is unlikely to be mixed with road noise. Thus, a driver or the like is considered likely to perceive electromagnetic noise. Accordingly, when the vehicle speed is lower than or equal to the predetermined vehicle speed, a determination is made that the quietness is needed inside the vehicle, and execution of the second PWM control as the control of the inverter is restricted. Thus, a need for the quietness inside the vehicle can be more sufficiently satisfied. Specifically, the driver or the like can have more sufficiently reduced perception of electromagnetic noise.

A third aspect of the present disclosure relates to an automobile including the drive apparatus according to the aspect, drive wheels driven by being connected to the motor, and an engine configured to output power for traveling to the drive wheels. The electronic control unit is configured to determine that the quietness is needed, when the automobile travels without operation of the engine. Engine sound is not generated when the automobile travels without operation of the engine. Thus, the driver or the like is considered more likely to perceive electromagnetic noise than when the automobile travels with operation of the engine. Accordingly, when the automobile travels without operation of the engine, a determination is made that the quietness is needed inside the vehicle, and execution of the second PWM control as the control of the inverter is restricted. Thus, a need for the quietness inside the vehicle can be more sufficiently satisfied. Specifically, the driver or the like can have more sufficiently reduced perception of electromagnetic noise.

A fourth aspect of the present disclosure relates to an automobile including the drive apparatus according to the aspect and drive wheels driven by being connected to the motor. The electronic control unit is configured to determine that the quietness is needed, when the number of lanes in a current location of the automobile is smaller than or equal to a predetermined number of lanes. When the number of lanes is small, the width of the road is smaller than when the number of lanes is great, and a pedestrian or the like around the automobile is considered more likely to perceive electromagnetic noise. Accordingly, when the number of lanes in the current location of the automobile is smaller than or equal to the predetermined number of lanes, a determination is made that the quietness is needed outside the vehicle, and execution of the second PWM control as the control of the inverter is restricted. Thus, a need for the quietness outside the vehicle can be more sufficiently satisfied. Specifically, the pedestrian or the like around the automobile can have more sufficiently reduced perception of electromagnetic noise.

A fifth aspect of the present disclosure relates to an automobile including the drive apparatus according to the aspect and drive wheels driven by being connected to the motor, in which the electronic control unit is configured to determine that the quietness is needed, at night. At night, the pedestrian or the like around the automobile is considered more likely to perceive electromagnetic noise than at other than night (at day). Accordingly, at night, a determination is made that the quietness is needed outside the vehicle, and execution of the second PWM control as the control of the inverter is restricted. Thus, a need for the quietness outside the vehicle can be more sufficiently satisfied. Specifically, the pedestrian or the like around the automobile can have more sufficiently reduced perception of electromagnetic noise.

A sixth aspect of the present disclosure relates to an automobile including the drive apparatus according to the aspect, drive wheels driven by being connected to the motor, an engine, a power generator configured to generate electric power by using power from the engine, and a power generator inverter configured to drive the power generator by switching of a plurality of second switching elements. The electricity storing device exchanges electric power with the motor and the power generator through the inverter and the power generator inverter. The electronic control unit is configured to control the engine and the power generator inverter such that the electricity storing device is charged with electric power generated by the power generator using power from the engine, when an electricity storage ratio of the electricity storing device is lower than or equal to a predetermined ratio at a standstill of the automobile. The electronic control unit is configured to control the power generator inverter by switching between the first PWM control and the second PWM control. The electronic control unit determines that the quietness is needed, when the automobile is at a standstill. When the quietness is needed, the electronic control unit is configured to restrict execution of the second PWM control as the controls of the inverter and the power generator inverter, compared with when the quietness is not needed. Since road noise is not generated at a standstill, the driver or the like at a standstill is considered more likely to perceive electromagnetic noise than during traveling. Accordingly, when the automobile is at a standstill, a determination is made that the quietness is needed inside the vehicle, and execution of the second PWM control as the controls of the inverter and the power generator inverter is restricted. Thus, a need for the quietness inside the vehicle can be more sufficiently satisfied. Specifically, the driver or the like can have more sufficiently reduced perception of electromagnetic noise.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, an embodiment of the present disclosure will be described.

Figure 1:
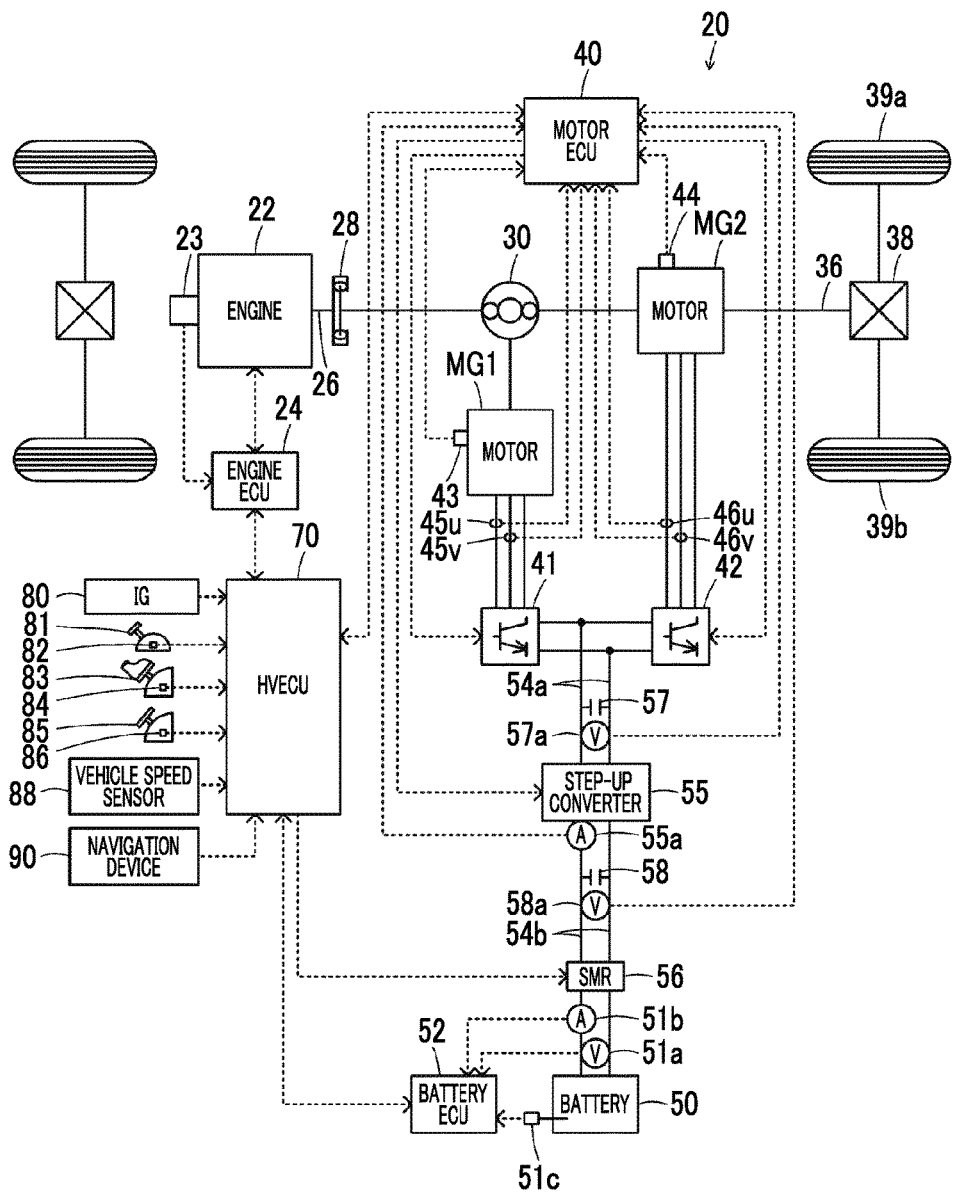
FIG. 1 is a configuration diagram illustrating a schematic configuration of a hybrid automobile in which a drive apparatus of an embodiment is mounted.
Figure 2:
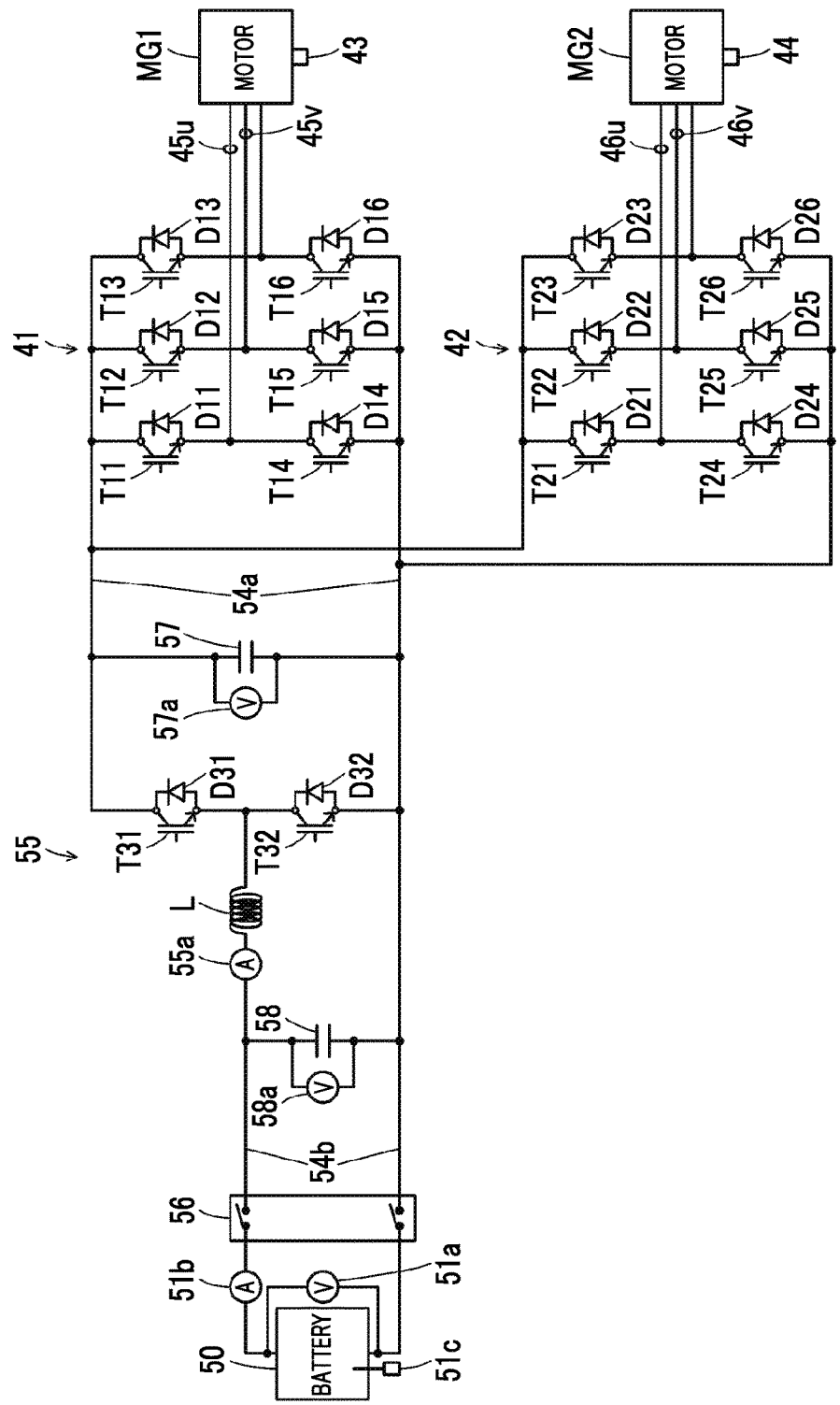
FIG. 2 is a configuration diagram illustrating a schematic configuration of an electric drive system including a motor.

FIG. 1 is a configuration diagram illustrating a schematic configuration of a hybrid automobile 20 in which a drive apparatus as the embodiment of the present disclosure is mounted. FIG. 2 is a configuration diagram illustrating a schematic configuration of an electric drive system including motors MG1, MG2. As illustrated in FIG. 1, the hybrid automobile 20 of the embodiment includes an engine 22, a planetary gear 30, the motors MG1, MG2, inverters 41, 42, a battery 50 as an electricity storing device, a step-up converter 55, a system main relay 56, a navigation device 90, and a hybrid electronic control unit (hereinafter, referred to as an "HVECU") 70.

The engine 22 is configured as an internal combustion engine that outputs power with gasoline, diesel, or the like as fuel. Operation of the engine 22 is controlled by an engine electronic control unit (hereinafter, referred to as an "engine ECU") 24.

The engine ECU 24, though not illustrated, is configured as a microprocessor mainly having a CPU and includes a ROM storing a processing program, a RAM temporarily storing data, input and output ports, and a communication port in addition to the CPU. Signals from various sensors controlling operation of the engine 22, for example, a crank angle θcr from a crank position sensor 23 detecting a rotation position of a crankshaft 26 of the engine 22, are input into the engine ECU 24 from the input port. Various control signals that control operation of the engine 22 are output from the engine ECU 24 through the output port. The engine ECU 24 is connected to the HVECU 70 through the communication port. The engine ECU 24 calculates the number of rotations Ne of the engine 22 based on the crank angle θcr from the crank position sensor 23.

The planetary gear 30 is configured as a single pinion planetary gear mechanism. A rotor of the motor MG1 is connected to a sun gear of the planetary gear 30. A drive shaft 36 that is connected to drive wheels 39a, 39b through a differential gear 38 is connected to a ring gear of the planetary gear 30. The crankshaft 26 of the engine 22 is connected to a carrier of the planetary gear 30 through a damper 28.

The motor MG1 is configured as a synchronous power generating electric motor having the rotor in which a permanent magnet is embedded and a stator on which three-phase coils are wound. The rotor of the motor MG1 is connected to the sun gear of the planetary gear 30 as described above. The motor MG2, in the same manner as the motor MG1, is configured as a synchronous power generating electric motor having a rotor in which a permanent magnet is embedded and a stator on which three-phase coils are wounded. The rotor of the motor MG2 is connected to the drive shaft 36.

As illustrated in FIG. 2, the inverter 41 is connected to a high voltage side electric power line 54a. The inverter 41 has six transistors T11 to T16 and six diodes D11 to D16 that are connected in parallel to the transistors T11 to T16 in the reverse direction. The transistors T11 to T16 are disposed in pairs of two as a source side and a sink side respectively for a positive pole side line and a negative pole side line of the high voltage side electric power line 54a. The three-phase coils (a U phase, a V phase, and a W phase) of the motor MG1 are respectively connected to connection points between the transistor pairs of the transistors T11 to T16. Accordingly, when a voltage is applied to the inverter 41, the motor electronic control unit (hereinafter, referred to as a "motor ECU") 40 adjusts the proportions of ON times of the pairs of the transistors T11 to T16, thereby forming a rotating magnetic field in the three-phase coils and rotationally driving the motor MG1. The inverter 42, in the same manner as the inverter 41, is connected to the high voltage side electric power line 54a and has six transistors T21 to T26 and six diodes D21 to D26. When a voltage is applied to the inverter 42, the motor ECU 40 adjusts the proportions of ON times of the pairs of the transistors T21 to T26, thereby forming a rotating magnetic field in the three-phase coils and rotationally driving the motor MG2.

The step-up converter 55 is connected to the high voltage side electric power line 54a to which the inverters 41, 42 are connected and to a low voltage side electric power line 54b to which the battery 50 is connected. The step-up converter 55 has two transistors T31, T32, two diodes D31, D32 connected in parallel to the transistors T31, T32 in the reverse direction, and a reactor L. The transistor T31 is connected to the positive pole side line of the high voltage side electric power line 54a. The transistor T32 is connected to the transistor T31 and negative pole side lines of the high voltage side electric power line 54a and the low voltage side electric power line 54b. The reactor L is connected to a connection point between the transistors T31, T32 and to a positive pole side line of the low voltage side electric power line 54b. By the motor ECU 40 adjusting the proportions of ON times of the transistors T31, T32, the step-up converter 55 steps up and supplies power of the low voltage side electric power line 54b to the high voltage side electric power line 54a or steps down and supplies power of the high voltage side electric power line 54a to the low voltage side electric power line 54b. A smoothing capacitor 57 is attached to the positive pole side line and the negative pole side line of the high voltage side electric power line 54a. A smoothing capacitor 58 is attached to the positive pole side line and the negative pole side line of the low voltage side electric power line 54b.

The motor ECU 40, though not illustrated, is configured as a microprocessor mainly having a CPU and includes a ROM storing a processing program, a RAM temporarily storing data, input and output ports, and a communication port in addition to the CPU. As illustrated in FIG. 1, signals from various sensors controlling driving of the motors MG1, MG2 or the step-up converter 55 are input into the motor ECU 40 through the input port. Examples of the signals input into the motor ECU 40 include rotation positions θm1, θm2 from rotation position detecting sensors (for example, resolvers) 43, 44 that detect rotation positions of the rotors of the motors MG1, MG2, and phase currents Iu1, Iv1, Iu2, Iv2 from current sensors 45u, 45v, 46u, 46v that detect currents flowing in each of the phases of the motors MG1, MG2. In addition, examples of the signals include a voltage VH of the capacitor 57 (the voltage of the high voltage side electric power line 54a) from a voltage sensor 57a attached between terminals of the capacitor 57, a voltage VL of the capacitor 58 (the voltage of the low voltage side electric power line 54b) from a voltage sensor 58a attached between terminals of the capacitor 58, and a current IL from a current sensor 55a attached to a terminal of the reactor L, the current IL flowing in the reactor L. Switching control signals for the transistors T11 to T16, T21 to T26 of the inverters 41, 42, switching control signals for the transistors T31, T32 of the step-up converter 55, and the like are output from the motor ECU 40 through the output port. The motor ECU 40 is connected to the HVECU 70 through the communication port. The motor ECU 40 calculates electrical angles $\theta_{e1}$, $\theta_{e2}$ and numbers of rotations Nm1, Nm2 of the motors MG1, MG2 based on the rotation positions θm1, θm2 of the rotors of the motors MG1, MG2 from the rotation position detecting sensors 43, 44.

The battery 50 is configured as, for example, a secondary lithium-ion battery or a secondary nickel-hydrogen battery and is connected to the low voltage side electric power line 54b. The battery 50 is managed by a battery electronic control unit (hereinafter, referred to as a "battery ECU") 52.

The battery ECU 52, though not illustrated, is configured as a microprocessor mainly having a CPU and includes a ROM storing a processing program, a RAM temporarily storing data, input and output ports, and a communication port in addition to the CPU. Signals from various sensors managing the battery 50 are input into the battery ECU 52 through the input port. Examples of the signals input into the battery ECU 52 include a voltage Vb from a voltage sensor 51a disposed between terminals of the battery 50, a current Ib from a current sensor 51b attached to an output terminal of the battery 50, and a temperature Tb from a temperature sensor 51c attached to the battery 50. The battery ECU 52 is connected to the HVECU 70 through the communication port. The battery ECU 52 calculates an electricity storage ratio SOC based on the cumulative value of the battery current Ib from the current sensor 51b. The electricity storage ratio SOC is the ratio of electric power discharge capacity of the battery 50 to the total capacity of the battery 50.

The system main relay 56 is disposed on the battery 50 side of the low voltage side electric power line 54b from the capacitor 58. The system main relay 56 is controlled to be switched ON and OFF by the HVECU 70, thereby connecting and disconnecting the battery 50 and the step-up converter 55.

The navigation device 90 includes a main body, a GPS antenna, and a touch panel display. The main body incorporates a storage medium such as a hard disk that stores map information and the like, and a control unit that has input and output ports, a communication port, and the like. The GPS antenna receives information related to the current location of the automobile. The touch panel display displays various types of information such as information related to the current location of the automobile and a travel route to a destination and can receive various instructions from an operator. The map information as a database stores service information (for example, tourism information, parking lots, and charging stations), road information per predetermined travel section (for example, between traffic lights or between intersections), and the like. The road information includes distance information, width information, information as to the number of lanes, area information (an urban area or a suburb), type information (a typical road or a highway), gradient information, legal speed information, the number of traffic lights, and the like. When a destination is set by the operator, the navigation device 90 finds a travel route from the current location of the automobile to the destination based on the map information and the current location and the destination of the automobile and provides route guidance by outputting the found travel route on a display. The navigation device 90 calculates route information (for example, a remaining distance Ln to the destination and a direction Dn to the destination) on the travel route. The navigation device 90 is connected to the HVECU 70 through the communication port.

The HVECU 70, though not illustrated, is configured as a microprocessor mainly having a CPU and includes a ROM storing a processing program, a RAM temporarily storing data, input and output ports, and a communication port in addition to the CPU. Signals from various sensors are input into the HVECU 70 through the input port. Examples of the signals input into the HVECU 70 include an ignition signal from an ignition switch 80 and a shift position SP from a shift position sensor 82 that detects an operating position of a shift lever 81. In addition, examples of the signals include an accelerator operation amount Acc from an accelerator pedal position sensor 84 that detects the amount of stepping on an accelerator pedal 83, a brake pedal position BP from a brake pedal position sensor 86 that detects the amount of stepping on a brake pedal 85, and a vehicle speed V from a vehicle speed sensor 88. The shift position SP includes a parking position (P position), a reverse position (R position), a neutral position (N position), a forward position (D position), and the like. As described above, the HVECU 70 is connected to the engine ECU 24, the motor ECU 40, the battery ECU 52, and the navigation device 90 through the communication port.

Such configured hybrid automobile 20 of the embodiment travels in a hybrid travel (HV travel) mode of traveling along with operation of the engine 22 and an electric travel (EV travel) mode of traveling without operation of the engine 22.

In the HV travel mode, the HVECU 70 sets a requested torque Td* for traveling (for the drive shaft 36) based on the accelerator operation amount Acc and the vehicle speed V and calculates requested power Pd* for traveling (for the drive shaft 36) by multiplying the set requested torque Td* by the number of rotations Nd of the drive shaft 36 (the number of rotations Nm2 of the motor MG2). Next, the HVECU 70 sets requested power Pe* for the automobile (for the engine 22) by subtracting a charge and discharge requested power Pb* (has a positive value at the time of discharge from the battery 50) based on the electricity storage ratio SOC of the battery 50 from the requested power Pd*. Next, the HVECU 70 sets a target number of rotations Ne* and a target torque Te* of the engine 22 and torque commands Tm1*, Tm2* of the motors MG1, MG2 such that the requested power Pe* is output from the engine 22 and that the requested torque Td* is output to the drive shaft 36. Next, the HVECU 70 sets a target voltage VH* of the high voltage side electric power line 54a (capacitor 57) based on the torque commands Tm1*, Tm2* and the numbers of rotations Nm1, Nm2 of the motors MG1, MG2. The HVECU 70 transmits the target number of rotations Ne* and the target torque Te* of the engine 22 to the engine ECU 24 and transmits the torque commands Tm1*, Tm2* of the motors MG1, MG2 and the target voltage VH* of the high voltage side electric power line 54a to the motor ECU 40. The engine ECU 24 controls the amount of air intake, fuel injection, ignition, and the like of the engine 22 such that the engine 22 is operated based on the target number of rotations Ne* and the target torque Te*. The motor ECU 40 controls switching of the transistors T11 to T16, T21 to T26 of the inverters 41, 42 such that the motors MG1, MG2 are driven by the torque commands Tm1*, Tm2*, and controls switching of the transistors T31, T32 of the step-up converter 55 such that the voltage VH of the high voltage side electric power line 54a is equal to the target voltage VH*.

In the EV travel mode, the HVECU 70 sets the requested torque Td* based on the accelerator operation amount Acc and the vehicle speed V, sets the torque command Tm1* of the motor MG1 to a value of zero and sets the torque command Tm2* of the motor MG2 such that the requested torque Td* is output to the drive shaft 36, and sets the target voltage VH* of the high voltage side electric power line 54a based on the torque commands Tm1*, Tm2* and the numbers of rotations Nm1, Nm2 of the motors MG1, MG2. The HVECU 70 transmits the torque commands Tm1*, Tm2* of the motors MG1, MG2 and the target voltage VH* of the high voltage side electric power line 54a to the motor ECU 40. Control of the inverters 41, 42 and the step-up converter 55 by the motor ECU 40 is described above.

Control of the inverters 41, 42 will be described. Each of the inverters 41, 42 in the embodiment executes a first PWM control and a second PWM control in a switched manner (any of the first PWM control and the second PWM control is set as an execution control). The first PWM control switches the transistors T11 to T16, T21 to T26 by generating a first PWM signal of the transistors T11 to T16, T21 to T26 by comparing a voltage command of each of the phases of the motors MG1, MG2 with a carrier wave voltage (triangular wave voltage). The second PWM control switches the transistors T11 to T16, T21 to T26 by generating a second PWM signal of the transistors T11 to T16, T21 to T26 based on voltage modulation rates Rm1, Rm2, voltage phases θp1, θp2, and numbers of pulses Np1, Np2 in a unit cycle (for example, a half cycle or one cycle of the electrical angles of the motors MG1, MG2). In the second PWM control, the numbers of pulses Np1, Np2 are set such that the number of switchings of the transistors T11 to T16, T21 to T26 is smaller than in the first PWM control. The first PWM signal in the first PWM control is generated at an interval Δt1 that corresponds to a half cycle or one cycle of the carrier wave voltage (a triangular wave voltage having a frequency of approximately 3 kHz to 5 kHz). The second PWM signal in the second PWM control is generated at an interval Δt2 longer than the interval Δt1.

A method of generating the second PWM signal of the transistors T11 to T16 in the second PWM control of the inverter 41 will be described. Examples of the method of generating the second PWM signal include a first method, a second method, and a third method below. A method of generating the second PWM signal of the transistors T21 to T26 in the second PWM control of the inverter 42 can be considered to be the same.

Examples of the first method include a method of generating the second PWM signal such that a low-order harmonic component is reduced further than in the first PWM control. In the method, the second PWM signal of a pulse waveform (switching pattern) having half wave symmetry [f(ωm1·t)=−f(ωm1·t+π)] and odd symmetry [f(ωm1·t)=f(n−ωm1·t)] is generated, considering the low-order harmonic component. "ωm1" is the rotational angular speed of the motor MG1, and "t" is time. Accordingly, loss in the motor MG1 can be reduced along with a reduction in the low-order harmonic component. In the first method, when the motor MG1 has a low load (low torque) at low-speed rotation, the effect of reducing loss in the motor MG1 by reducing the low-order harmonic component may be small. Furthermore, iron loss in the motor may be increased by an increase in a non-target harmonic component due to a reduction in the low-order harmonic component.

Examples of the second method include a method of generating the second PWM signal such that eddy current loss in the motor MG1 is reduced further than in the first PWM control. In the method, the second PWM signal of a pulse waveform (switching pattern) having half wave symmetry [f(ωm1·t)=−f(ωm1·t+π)] is generated, considering not only the low-order harmonic component but also a high-order harmonic component. An advantage of employing such a pulse waveform is that a wider range of selections of pulse waveforms than the pulse waveform used in the first method is available and that an improvement in controllability of both of the amplitude and the phase of a frequency component included in the second PWM signal is expected.

The pulse waveform of the second PWM signal in the second method can be represented as General Formula (1) by using Fourier series. In General Formula (1), "$\theta_{e1,m}$" is an m-th switching position of the motor MG1. "$a_0$" is a direct current component, and "n" is 1, 5, 7, 11, 13, . . . (odd integers). "M" is the number of switchings of the transistors T11 to T16 in the unit cycle of the electrical angle $\theta_{e1}$ of the motor MG1, and a relationship between the number of switchings M and the number of pulses Np1 is "M=Np1−1". An amplitude $C_n$ and a phase $\alpha_n$ of each order can be acquired by General Formula (2) using a coefficient $a_n$ and a coefficient $b_n$ in General Formula (1). In the second method, the second PWM signal is generated by using the amplitude $C_n$, the phase $\alpha_n$, and the like of each order such that eddy current loss in the motor MG1 is reduced. Iron loss $W_i$ in motor MG1 can be represented by General Formula (3) as Steinmetz's equation. In General Formula (3), "$W_h$" is hysteresis loss in the motor MG1, and "$W_e$" is eddy current loss in the motor MG1. "$K_h$" is a hysteresis loss coefficient, and "$B_m$" is a magnetic flux density. "$f_{m1}$" is the rotating magnetic flux frequency of the motor MG1, and "$K_e$" is the eddy current loss coefficient of the motor MG1. Based on General Formula (3), the second method focuses on eddy current loss that has a great proportion in iron loss in the motor MG1. More specifically, the second PWM signal is generated such that eddy current loss as an evaluation function is minimized (eddy current loss in iron loss in the motor MG1 is minimized). Accordingly, loss in the motor MG1 can be further reduced along with a reduction in each of the harmonic components of the low-order harmonic to the high-order harmonic.

$$f(\theta_{e1}) = \frac{a_0}{2} + \sum_{n=1}^{\infty}(a_n\cos n\theta_{e1} + b_n\sin n\theta_{e1}) \quad (1)$$

$$a_n = \frac{1}{\pi}\int_0^{2\pi} f(\theta_{e1})\cos n\theta_{e1} d\theta_{e1} = -\frac{2}{n\pi}\sum_{m=1}^{M}(-1)^m \sin n\theta_{e1,m}$$

$$b_n = \frac{1}{\pi}\int_0^{2\pi} f(\theta_{e1})\sin n\theta_{e1} d\theta_{e1} = \frac{2}{n\pi}\left\{\left(\sum_{m=1}^{M}(-1)^m \cos n\theta_{e1,m}\right) + 1\right\}$$

$$C_n = \sqrt{a_n^2 + b_n^2} \quad (2)$$

$$\alpha_n = \tan^{-1}\frac{b_n}{a_n}$$

$$W_i = W_h + W_e = K_h B_m^2 f_{m1} + K_e B_m^2 f_{m1} \quad (3)$$

Figure 3:
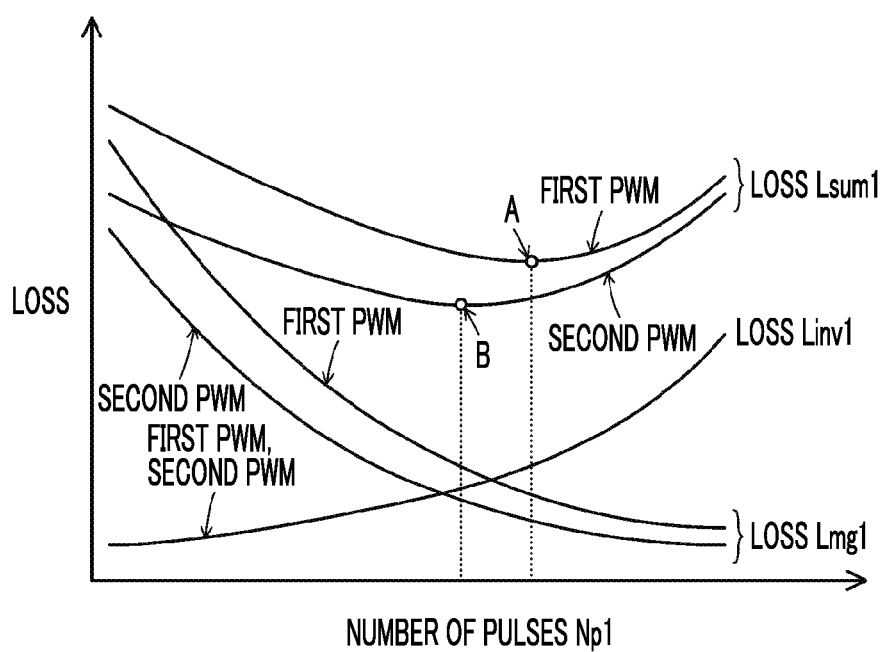
FIG. 3 is a descriptive diagram illustrating one example of a relationship of the number of pulses with loss in the motor, loss in an inverter, and total loss in a first PWM control and a second PWM control.

Examples of the third method include a method of generating the second PWM signal such that total loss Lsum1 of loss Lmg1 in motor MG1 and loss Linv1 in the inverter 41 is reduced. FIG. 3 is a descriptive diagram illustrating one example of a relationship of the number of pulses Np1 with the loss Lmg1 in the motor MG1, the loss Linv1 in the inverter 41, and the total loss Lsum1 in the first PWM control and the second PWM control. In FIG. 3, a point A is the number of pulses Np1 where the total loss Lsum1 in the first PWM control is minimized, and a point B is the number of pulses Np1 where the total loss Lsum1 in the second PWM control is minimized. The inventors find by experiment and analysis that the number of pulses Np1 that leads to a smaller number of switchings of the transistors T11 to T16 of the inverter 41 than in the first PWM control may be used as illustrated in FIG. 3 in order to reduce the total loss Lsum1 further than in the first method and the second method. Accordingly, in the third method, the second PWM signal is generated by using the determined number of pulses Np1 such that a reduction in each of the harmonic components of the low-order harmonic to the high-order harmonic and a reduction in the total loss Lsum1 are greater than in the first PWM control. Accordingly, the total loss Lsum1 can be further reduced along with a reduction in each of the harmonic components of the low-order harmonic to the high-order harmonic.

The embodiment uses the third method of the first method, the second method, and the third method above as the method of generating the second PWM signal of the transistors T11 to T16 in the second PWM control for the inverter 41. The first method and the second method may also be used.

In the case of executing the first PWM control, the number of switchings of the transistors T11 to T16, T21 to T26 is greater with a shorter generation cycle of the PWM signal than in the case of executing the second PWM control. Thus, an increase in noise (electromagnetic noise) due to switching of the transistors T21 to T26 can be reduced, or controllability of the motors MG1, MG2 can be increased. In the case of executing the second PWM control, an increase in electromagnetic noise or a decrease in the controllability of the motors MG1, MG2 is more likely than in the case of executing the first PWM control. However, the total loss Lsum1 can be further reduced along with a reduction in each of the harmonic components of the low-order harmonic to the high-order harmonic.

When the electricity storage ratio SOC of the battery 50 at a standstill (during parking) is smaller than or equal to a threshold Slo (for example, 35% or 40%) in the hybrid automobile 20 of the embodiment, the engine 22 is cranked and started by the motor MG1 by cooperative control of the HVECU 70, the engine ECU 24, and the motor ECU 40. When the engine 22 is started, the HVECU 70 sets the target number of rotations Ne* and the target torque Te* of the engine 22 such that the engine 22 is operated at a charging operating point of the battery 50, sets the torque command Tm1* of the motor MG1 such that power is generated by the motor MG1 using power from the engine 22, and sets the torque command Tm2* of the motor MG2 such that torque output from the motor MG1 and applied to the drive shaft 36 through the planetary gear 30 is canceled out. Next, the HVECU 70 sets the target voltage VH* of the high voltage side electric power line 54a based on the torque commands Tm1*, Tm2* and the numbers of rotations Nm1, Nm2 of the motors MG1, MG2. The HVECU 70 transmits the target number of rotations Ne* and the target torque Te* of the engine 22 to the engine ECU 24 and transmits the torque commands Tm1*, Tm2* of the motors MG1, MG2 and the target voltage VH* of the high voltage side electric power line 54a to the motor ECU 40. Control of the engine 22 by the engine ECU 24 and control of the inverters 41, 42 and the step-up converter 55 by the motor ECU 40 are described above. The battery 50 is charged from electric power generated by the motor MG1 using power from the engine 22. When the electricity storage ratio SOC of the battery 50 reaches a threshold Shi (for example 45% or 50%) that is greater than the threshold Slo, operation of the engine 22 is stopped, and charging of the battery 50 is finished.

Figure 4:
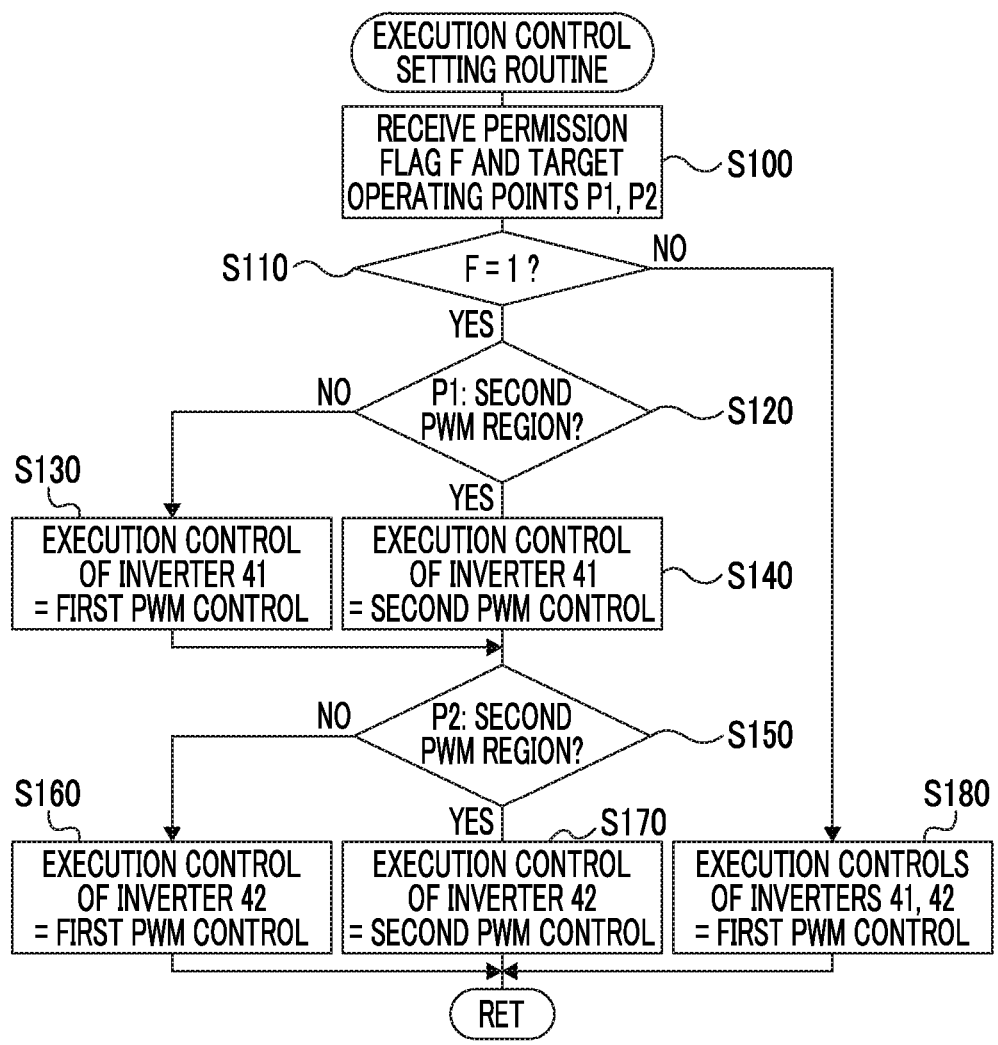
FIG. 4 is a flowchart illustrating one example of an execution control setting routine executed by a motor electronic control unit (ECU)

Next, operation of such configured hybrid automobile 20 of the embodiment, particularly, operation thereof at the time of setting each of the execution controls of the inverters 41, 42 from the first PWM control or the second PWM control will be described. FIG. 4 is a flowchart illustrating one example of an execution control setting routine executed by the motor ECU 40. The routine is repeated.

When the execution control setting routine is executed, the motor ECU 40, first, receives data such as a permission flag F, a target operating point (the number of rotations Nm1 and the torque command Tm1*) P1 of the motor MG1, and a target operating point (the number of rotations Nm2 and the torque command Tm2*) P2 of the motor MG2 (step S100). The permission flag F is a flag that is set to a value of one when execution of the second PWM control as controls of the inverters 41, 42 is permitted, and is set to a value of zero when execution of the second PWM control as the controls of the inverters 41, 42 is prevented. The permission flag F input is set by a permission flag setting routine in FIG. 6 that is repeated in parallel with the present routine. The numbers of rotations Nm1, Nm2 of the motors MG1, MG2 input have values that are calculated based on the rotation position θm2 of the rotors of the motors MG1, MG2 from the rotation position detecting sensors 43, 44. The torque commands Tm1*, Tm2* of the motors MG1, MG2 input have values that are set by the drive control described above.

Figure 5:
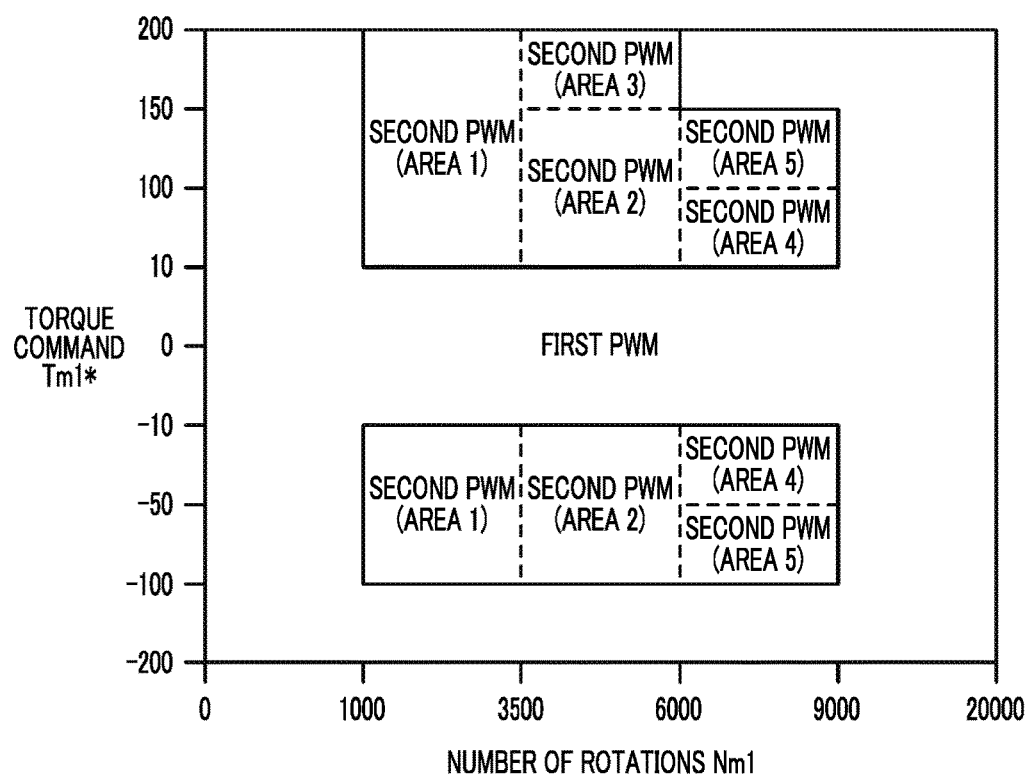
FIG. 5 is a descriptive diagram illustrating one example of a relationship of a target operating point of the motor with a region of the first PWM control and a region of the second PWM control.

When the data is input, the value of the received permission flag F is checked (step S110). When the permission flag F has a value of one, that is, when execution of the second PWM control as the controls of the inverters 41, 42 is permitted, a determination as to whether the target operating point P1 of the motor MG1 falls within the region of the first PWM control or the region of the second PWM control is performed (step S120). FIG. 5 is a descriptive diagram illustrating one example of a relationship of the target operating point P1 of the motor MG1 with the region of the first PWM control and the region of the second PWM control. In the embodiment, the region of the first PWM control and the region of the second PWM control for the target operating point P1 of the motor MG1 are based on experiment results and analysis results of execution of the first PWM control and the second PWM control for each target operating point P1 of the motor MG1, such that a region that is expected to have the effect of execution of the second PWM control to a certain extent is determined as the region of the second PWM control and that a region that is not expected to have the effect is determined as the region of the first PWM control. In the example of FIG. 5, for the target operating point P1 of the motor MG1, areas 1 to 5 below are set as the region of the second PWM control, and a region other than the region of the second PWM control is set as the region of the first PWM control. The area 1 is set to have a region in which the torque command Tm1* is greater than or equal to 10 Nm with the number of rotations Nm1 of the motor MG1 being 1,000 rpm to 3,500 rpm, and a region in which the torque command Tm1* is −100 Nm to −10 Nm with the number of rotations Nm1 being 1,000 rpm to 3,500 rpm. The area 2 is set to have a region in which the torque command Tm1* is 10 Nm to 150 Nm with the number of rotations Nm1 of the motor MG1 being 3,500 rpm to 6,000 rpm, and a region in which the torque command Tm1* is −100 Nm to −10 Nm with the number of rotations Nm1 being 3,500 rpm to 6,000 rpm. The area 3 is set to have a region in which the torque command Tm1* is greater than or equal to 150 Nm with the number of rotations Nm1 of the motor MG1 being 3,500 rpm to 6,000 rpm. The area 4 is set to have a region in which the torque command Tm1* is 10 Nm to 100 Nm with the number of rotations Nm1 of the motor MG1 being 6,000 rpm to 9,000 rpm, and a region in which the torque command Tm1* is −50 Nm to −10 Nm with the number of rotations Nm1 being 6,000 rpm to 9,000 rpm. The area 5 is set to have a region in which the torque command Tm1* is 100 Nm to 150 Nm with the number of rotations Nm1 of the motor MG1 being 6,000 rpm to 9,000 rpm, and a region in which the torque command Tm1* is −100 Nm to −50 Nm with the number of rotations Nm1 being 6,000 rpm to 9,000 rpm. In FIG. 5, each of the values of the number of rotations Nm1 and the torque command Tm1* of the motor MG1, the divisions of the region of the first PWM control and the region of the second PWM control, and the divisions of the areas (includes the number of areas) in the region of the second PWM control are for illustrative purposes and are appropriately set in accordance with the specifications of the motor MG1, the inverter 41, and the like.

When the target operating point P1 of the motor MG1 falls within the region of the first PWM control in step S120, the first PWM control is set as the execution control of the inverter 41 (step S130). Meanwhile, when the target operating point P1 of the motor MG1 falls within the region of the second PWM control, the second PWM control is set as the execution control of the inverter 41 (step S140).

Next, a determination as to whether the target operating point P2 of the motor MG2 falls within the region of the first PWM control or the region of the second PWM control is performed (step S150). The region of the first PWM control and the region of the second PWM control for the target operating point P2 of the motor MG2 are set to be the same as the region of the first PWM control and the region of the second PWM control for the target operating point P1 of the motor MG1. When the target operating point P2 of the motor MG2 falls within the region of the first PWM control, the first PWM control is set as the execution control of the inverter 42 (step S160), and the present routine is finished. Meanwhile, when the target operating point P2 of the motor MG2 falls within the region of the second PWM control, the second PWM control is set as the execution control of the inverter 42 (step S170), and the present routine is finished.

When the permission flag F has a value of zero in step S110, that is, when execution of the second PWM control as the controls of the inverters 41, 42 is prevented, the first PWM control is set as the execution controls of the inverters 41, 42 regardless of the target operating points P1, P2 of the motors MG1, MG2 (step S180), and the present routine is finished.

Next, the permission flag setting routine in FIG. 6 will be described. The routine is repeated by the motor ECU 40 in parallel with the execution control setting routine in FIG. 4. When the permission flag setting routine is executed, the motor ECU 40 receives the vehicle speed V from the vehicle speed sensor 88 through the HVECU 70 (step S200) and determines whether or not the input vehicle speed V is lower than or equal to a threshold Vref (step S210). The process of step S210 is a process of determining whether or not quietness is needed inside the vehicle. The threshold Vref can be, for example, 20 km/h, 25 km/h, or 30 km/h. When the vehicle speed V is low, road noise is smaller than when the vehicle speed V is high, and noise (electromagnetic noise) due to switching of the transistors T11 to T16, T21 to T26 of the inverters 41, 42 is unlikely to be mixed with road noise. Thus, a driver or the like is considered likely to perceive electromagnetic noise. Based on this fact, the embodiment determines whether or not the vehicle speed V is lower than or equal to the threshold Vref, thereby determining whether or not quietness is needed inside the vehicle.

When the vehicle speed V is higher than the threshold Vref in step S210, the motor ECU 40 determines that quietness is not needed inside the vehicle (the driver or the like is unlikely to perceive electromagnetic noise), sets the permission flag F to a value of one, that is, permits execution of the second PWM control as the controls of the inverters 41, 42 (step S220), and finishes the present routine. In this case, the first PWM control or the second PWM control is set as each of the execution controls of the inverters 41, 42 in accordance with the target operating points P1, P2 of the motors MG1, MG2 in the execution control setting routine in FIG. 4.

Meanwhile, when the vehicle speed V is lower than or equal to the threshold Vref, the motor ECU 40 determines that quietness is needed inside the vehicle (the driver or the like is likely to perceive electromagnetic noise), sets the permission flag F to a value of zero, that is, prevents execution of the second PWM control as the controls of the inverters 41, 42 (step S230), and finishes the present routine. In this case, the first PWM control is set as both of the execution controls of the inverters 41, 42 regardless of the target operating points P1, P2 of the motors MG1, MG2 in the execution control setting routine in FIG. 4.

As described above, when the second PWM control is executed as the controls of the inverters 41, 42, electromagnetic noise is likely to be greater than when the first PWM control is executed. Thus, when the second PWM control is executed as the controls of the inverters 41, 42 at the time of the vehicle speed V being comparatively low, the driver or the like may perceive electromagnetic noise. When the vehicle speed V is lower than or equal to the threshold Vref, the embodiment determines that quietness is needed inside the vehicle, and executes the first PWM control as both of the controls of the inverters 41, 42 (by preventing execution of the second PWM control), thereby being capable of more sufficiently satisfying a need for quietness inside the vehicle than in the execution of the second PWM control as at least one of the controls of the inverters 41, 42. Specifically, the driver or the like can have more sufficiently reduced perception of electromagnetic noise.

When the vehicle speed V is lower than or equal to the threshold Vref, the hybrid automobile 20 of the embodiment described heretofore determines that quietness is needed inside the vehicle, and executes the first PWM control as both of the controls of the inverters 41, 42 (by preventing execution of the second PWM control). Accordingly, a need for quietness inside the vehicle can be more sufficiently satisfied than in the execution of the second PWM control as at least one of the controls of the inverters 41, 42. Specifically, the driver or the like can have more sufficiently reduced perception of electromagnetic noise.

Figure 6:
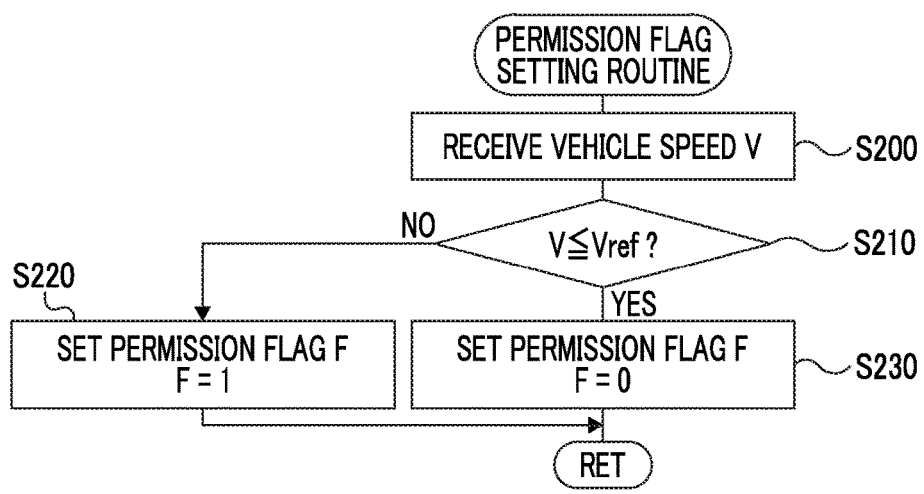
FIG. 6 is a descriptive diagram illustrating one example of a permission flag setting routine executed by the motor ECU.

In the hybrid automobile 20 of the embodiment, while the motor ECU 40 sets the permission flag F by the permission flag setting routine in FIG. 6, the motor ECU 40 may set the permission flag F by any of permission flag setting routines in FIG. 7 to FIG. 10. Hereinafter, the permission flag setting routines will be described in order.

Figure 7:
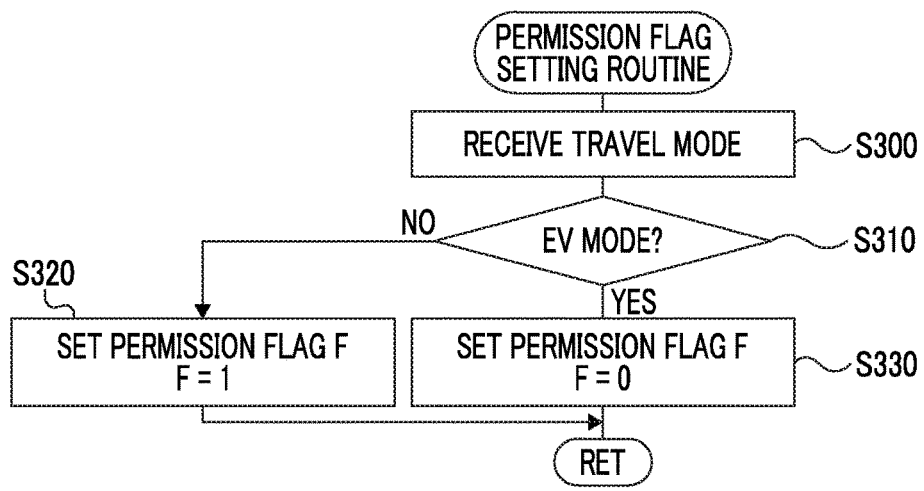
FIG. 7 is a descriptive diagram illustrating one example of a permission flag setting routine of a modification example.

First, the permission flag setting routine in FIG. 7 will be described. When the permission flag setting routine in FIG. 7 is executed, the motor ECU 40 receives a travel mode (the HV travel mode or the EV travel mode) (step S300) and determines whether or not the input travel mode is the EV travel mode (step S310). The process of step S310 is a process of determining whether or not quietness is needed inside the vehicle, as in the process of step S210. In the EV travel mode, operation of the engine 22 is stopped (engine sound is not generated). Thus, the driver or the like is considered more likely to perceive electromagnetic noise than in the HV travel mode. Based on this fact, the modification example determines whether or not the travel mode is the EV travel mode, thereby determining whether or not quietness is needed inside the vehicle.

When the travel mode is not the EV travel mode (is the HV travel mode) in step S310, the motor ECU 40 determines that quietness is not needed inside the vehicle (the driver or the like is unlikely to perceive electromagnetic noise), sets the permission flag F to a value of one, that is, permits execution of the second PWM control as the controls of the inverters 41, 42 (step S320), and finishes the present routine. Meanwhile, when the travel mode is the EV travel mode, the motor ECU 40 determines that quietness is needed inside the vehicle (the driver or the like is likely to perceive electromagnetic noise), sets the permission flag F to a value of zero, that is, prevents execution of the second PWM control as the controls of the inverters 41, 42 (step S330), and finishes the present routine.

As described above, when the second PWM control is executed as the controls of the inverters 41, 42, electromagnetic noise is likely to be greater than when the first PWM control is executed. Thus, when the second PWM control is executed as the controls of the inverters 41, 42 at the time of the travel mode being the EV travel mode, the driver or the like may perceive electromagnetic noise. When the travel mode is the EV travel mode, the modification example determines that quietness is needed inside the vehicle, and executes the first PWM control as both of the controls of the inverters 41, 42 (by preventing execution of the second PWM control), thereby being capable of more sufficiently satisfying a need for quietness inside the vehicle than in the execution of the second PWM control as at least one of the controls of the inverters 41, 42. Specifically, the driver or the like can have more sufficiently reduced perception of electromagnetic noise.

Figure 8:
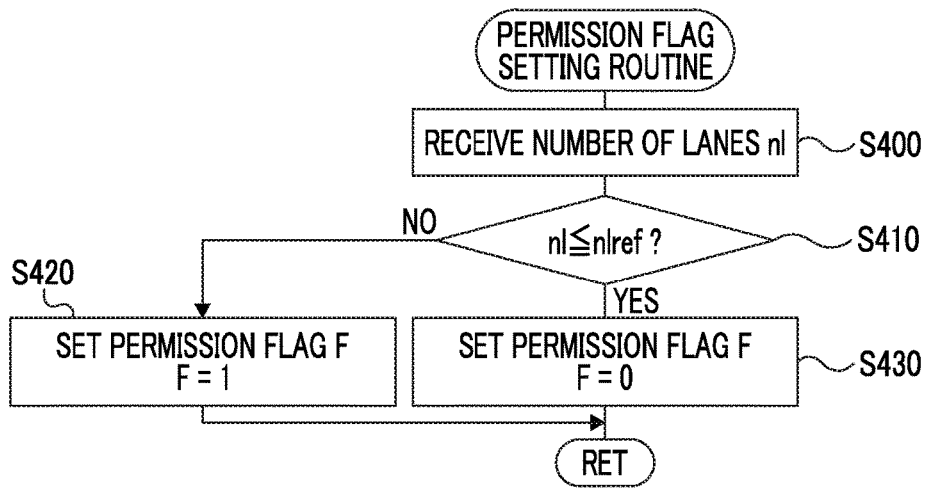
FIG. 8 is a descriptive diagram illustrating one example of a permission flag setting routine of a modification example.

Next, the permission flag setting routine in FIG. 8 will be described. When the permission flag setting routine in FIG. 8 is executed, the motor ECU 40 receives the number of lanes nl in the current location of the automobile from the navigation device 90 through the HVECU 70 (step S400) and determines whether or not the input number of lanes nl is smaller than or equal to a threshold nlref (step S410). The process of step S410 is a process of determining whether or not quietness is needed outside the vehicle. The threshold nlref can be, for example, a value that corresponds to one lane on one side. When the number of lanes is small, the width of the road is smaller than when the number of lanes is great, and a pedestrian or the like around the automobile is considered more likely to perceive electromagnetic noise. Based on this fact, the modification example determines whether or not the number of lanes nl is smaller than or equal to the threshold nlref, thereby determining whether or not quietness is needed outside the vehicle.

When the number of lanes nl is greater than the threshold nlref in step S410, the motor ECU 40 determines that quietness is not needed outside the vehicle (the pedestrian or the like around the automobile is unlikely to perceive electromagnetic noise), sets the permission flag F to a value of one, that is, permits execution of the second PWM control as the controls of the inverters 41, 42 (step S420), and finishes the present routine. Meanwhile, when the number of lanes nl is smaller than or equal to the threshold nlref, the motor ECU 40 determines that quietness is needed outside the vehicle (the pedestrian or the like around the automobile is likely to perceive electromagnetic noise), sets the permission flag F to a value of zero, that is, prevents execution of the second PWM control as the controls of the inverters 41, 42 (step S430), and finishes the present routine.

As described above, when the second PWM control is executed as the controls of the inverters 41, 42, electromagnetic noise is likely to be greater than when the first PWM control is executed. Thus, when the second PWM control is executed as the controls of the inverters 41, 42 at the time of the number of lanes nl being small, the pedestrian or the like around the automobile may perceive electromagnetic noise. When the number of lanes nl is smaller than or equal to the threshold nlref, the modification example determines that quietness is needed outside the vehicle, and executes the first PWM control as both of the controls of the inverters 41, 42 (by preventing execution of the second PWM control), thereby being capable of more sufficiently satisfying a need for quietness outside the vehicle than in the execution of the second PWM control as at least one of the controls of the inverters 41, 42. Specifically, the pedestrian or the like around the automobile can have more sufficiently reduced perception of electromagnetic noise.

In the permission flag setting routine in FIG. 8, while the permission flag F is set based on the number of lanes nl in the current location of the automobile, the permission flag F may be set based on the width, the area (an urban area or a suburb), the legal speed, or the like in the current location of the automobile instead of or in addition to the number of lanes nl. For example, when all conditions including a condition that the number of lanes nl is smaller than or equal to the threshold nlref, a condition that the width is smaller than or equal to a predetermined width, a condition that the area is an urban area, and a condition that the legal speed is lower than or equal to a predetermined speed are not established, the motor ECU 40 may determine that quietness is not needed outside the vehicle, and set the permission flag F to a value of one (prevent execution of the second PWM control as the controls of the inverters 41, 42). When at least one condition is established, the motor ECU 40 may determine that quietness is needed outside the vehicle, and set the permission flag F to a value of zero (permit execution of the second PWM control as the controls of the inverters 41, 42).

Figure 9:
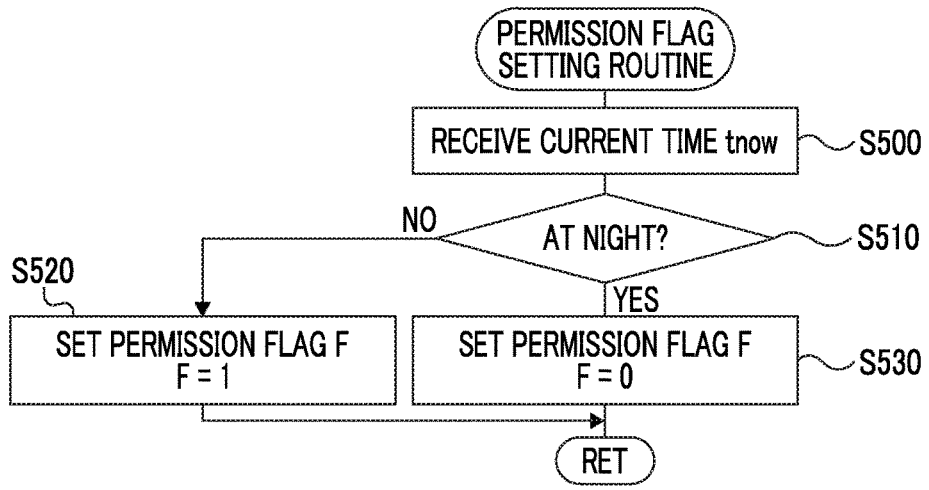
FIG. 9 is a descriptive diagram illustrating one example of a permission flag setting routine of a modification example.

Next, the permission flag setting routine in FIG. 9 will be described. When the permission flag setting routine in FIG. 9 is executed, the motor ECU 40 receives a current time tnow from a timepiece, not illustrated, through the HVECU 70 (step S500) and uses the input current time tnow to determine whether or not it is at night (step S510). "Night" may be uniformly determined as a time range of a first time (for example, 9 p.m., 10 p.m., or 11 p.m.) to a second time (5 a.m., 6 a.m., or 7 a.m. the next day) or may be determined as a time range of sunset to sunrise or the like in accordance with the season or the date. The process of step S510 is a process of determining whether or not quietness is needed outside the vehicle, as in the process of step S410. Generally, at night, the pedestrian or the like around the automobile is more likely to perceive electromagnetic noise than at other than night (at day). In addition, a permissible noise level at night is mostly set to be lower than the permissible noise level at other than night (at day). Based on these facts, the modification example determines whether or not it is at night, thereby determining whether or not quietness is needed outside the vehicle.

When it is not at night (it is at day) in step S510, the motor ECU 40 determines that quietness is not needed outside the vehicle (the pedestrian or the like around the automobile is unlikely to perceive electromagnetic noise), sets the permission flag F to a value of one, that is, permits execution of the second PWM control as the controls of the inverters 41, 42 (step S520), and finishes the present routine. Meanwhile, when it is nighttime, the motor ECU 40 determines that quietness is needed outside the vehicle (the pedestrian or the like around the automobile is likely to perceive electromagnetic noise), sets the permission flag F to a value of zero, that is, prevents execution of the second PWM control as the controls of the inverters 41, 42 (step S530), and finishes the present routine.

As described above, when the second PWM control is executed as the controls of the inverters 41, 42, electromagnetic noise is likely to be greater than when the first PWM control is executed. Thus, when the second PWM control is executed as the controls of the inverters 41, 42 at night, the pedestrian or the like around the automobile may perceive electromagnetic noise. At night, the modification example determines that quietness is needed outside the vehicle, and executes the first PWM control as both of the controls of the inverters 41, 42 (by preventing execution of the second PWM control), thereby being capable of more sufficiently satisfying a need for quietness outside the vehicle than in the execution of the second PWM control as at least one of the controls of the inverters 41, 42. Specifically, the pedestrian or the like around the automobile can have more sufficiently reduced perception of electromagnetic noise.

Figure 10:
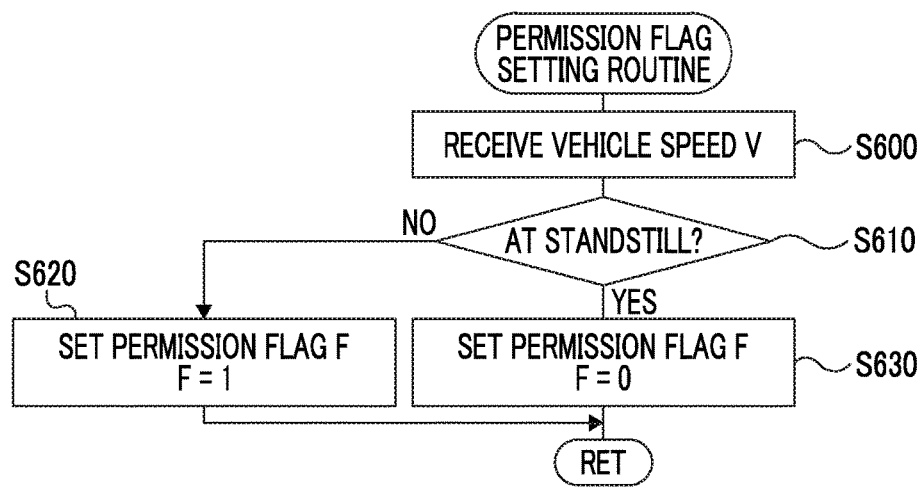
FIG. 10 is a descriptive diagram illustrating one example of a permission flag setting routine of a modification example.

Next, the permission flag setting routine in FIG. 10 will be described. When the permission flag setting routine in FIG. 10 is executed, the motor ECU 40 receives the vehicle speed V from the vehicle speed sensor 88 through the HVECU 70 (step S600) and uses the input vehicle speed V to determine whether or not the hybrid automobile 20 is at a standstill (step S610). The process of step S610 is a process of determining whether or not quietness is needed inside the vehicle, as in the process of step S210. Since road noise is not generated at a standstill, the driver or the like at a standstill is considered more likely to perceive electromagnetic noise than during traveling. Based on this fact, the modification example determines whether or not the hybrid automobile 20 is at a standstill, thereby determining whether or not quietness is needed inside the vehicle.

When the hybrid automobile 20 is not at a standstill in step S610, the motor ECU 40 determines that quietness is not needed inside the vehicle (the driver or the like is unlikely to perceive electromagnetic noise), sets the permission flag F to a value of one, that is, permits execution of the second PWM control as the controls of the inverters 41, 42 (step S620), and finishes the present routine. Meanwhile, when the hybrid automobile 20 is at a standstill, the motor ECU 40 determines that quietness is needed inside the vehicle (the driver or the like is likely to perceive electromagnetic noise), sets the permission flag F to a value of zero, that is, prevents execution of the second PWM control as the controls of the inverters 41, 42 (step S630), and finishes the present routine.

As described above, when the second PWM control is executed as the controls of the inverters 41, 42, electromagnetic noise is likely to be greater than when the first PWM control is executed. Thus, when the second PWM control is executed as the controls of the inverters 41, 42 at a standstill, the driver or the like may perceive electromagnetic noise. When the hybrid automobile 20 is at a standstill, the modification example determines that quietness is needed inside the vehicle, and executes the first PWM control as both of the controls of the inverters 41, 42 (by preventing execution of the second PWM control), thereby being capable of more sufficiently satisfying a need for quietness inside the vehicle than in the execution of the second PWM control as at least one of the controls of the inverters 41, 42. Specifically, the driver or the like can have more sufficiently reduced perception of electromagnetic noise.

As described in the routines in FIG. 6 to FIG. 10, the hybrid automobile 20 of the embodiment and the modification examples uses the following conditions as conditions for setting the permission flag F to a value of zero (preventing execution of the second PWM control as the controls of the inverters 41, 42). The routine in FIG. 6 uses a condition (A) the vehicle speed V is lower than or equal to the threshold Vref. The routine in FIG. 7 uses a condition (B) the travel mode is the EV travel mode. The routine in FIG. 8 uses a condition (C) the number of lanes nl is smaller than or equal to the threshold nlref. The routine in FIG. 9 uses a condition (D) it is at night. The routine in FIG. 10 uses a condition (E) the hybrid automobile 20 is at a standstill. Some or all of (A) to (E) may also be used in combination. For example, when all of (A) to (E) are used in combination, the permission flag F may be set to a value of zero at the time of establishment of at least one of (A) to (E).

While the hybrid automobile 20 of the embodiment prevents execution of the second PWM control (executes the first PWM control) as both of the controls of the inverters 41, 42 regardless of the target operating points P1, P2 of the motors MG1, MG2 when quietness is needed, the hybrid automobile 20 may restrict execution of the second PWM control. For example, execution of the second PWM control as the controls of the inverters 41, 42 may be prevented outside the area 1 (refer to FIG. 5) of the region of the second PWM control, or execution of the second PWM control may be prevented at other times than cruise travel in the region of the second PWM control.

While the hybrid automobile 20 of the embodiment includes the engine ECU 24, the motor ECU 40, the battery ECU 52, and the HVECU 70, some or all thereof may be configured as a single electronic control unit.

While the step-up converter 55 is disposed between the battery 50 and the inverters 41, 42 in the hybrid automobile 20 of the embodiment, the step-up converter 55 may not be disposed.

While the hybrid automobile 20 of the embodiment uses the battery 50 as an electricity storing device, the hybrid automobile 20 may use a capacitor.

Figure 11:
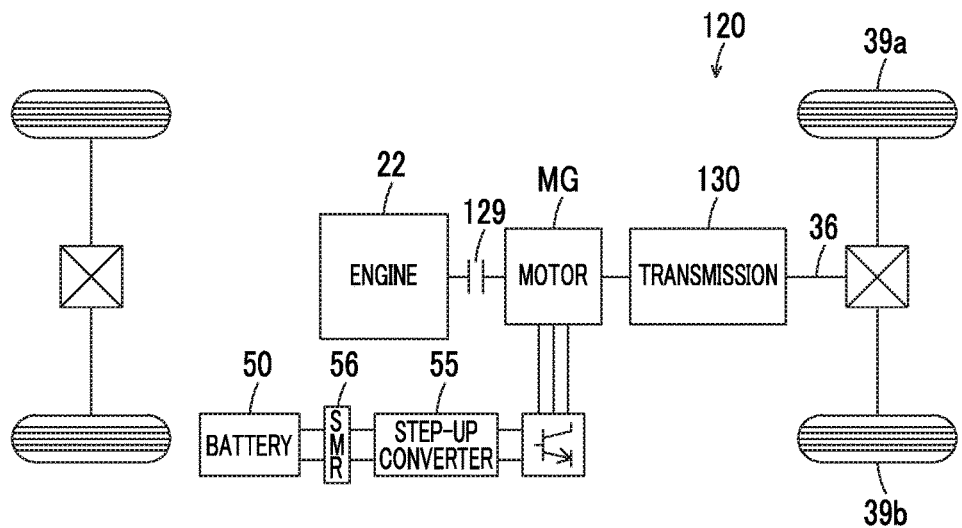
FIG. 11 is a configuration diagram illustrating a schematic configuration of a hybrid automobile of a modification example.
Figure 12:
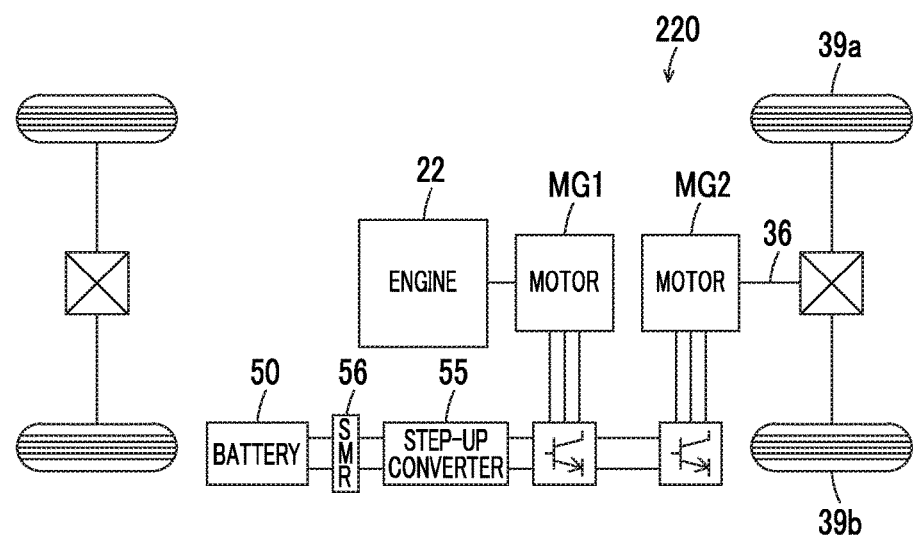
FIG. 12 is a configuration diagram illustrating a schematic configuration of a hybrid automobile of a modification example.
Figure 13:
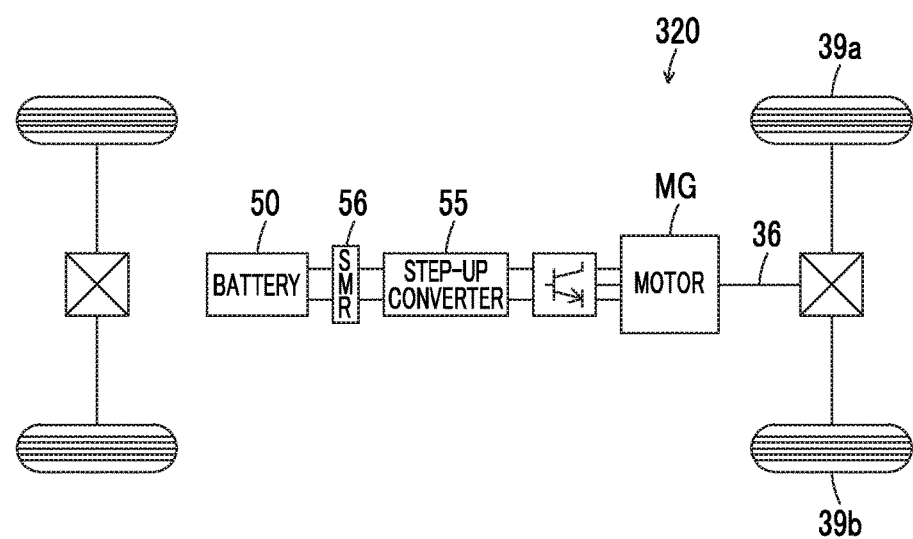
FIG. 13 is a configuration diagram illustrating a schematic configuration of an electric automobile of a modification example.

The hybrid automobile 20 of the embodiment is configured such that the engine 22 and the motor MG1 are connected through the planetary gear 30 to the drive shaft 36 connected to the drive wheels 39a, 39b and that the motor MG2 is connected to the drive shaft 36. However, as illustrated in a hybrid automobile 120 of a modification example in FIG. 11, a motor MG may be connected through a transmission 130 to the drive shaft 36 connected to the drive wheels 39a, 39b, and the engine 22 may be connected to a rotating shaft of the motor MG through a clutch 129. In addition, as illustrated in a hybrid automobile 220 of a modification example in FIG. 12, a so-called series hybrid automobile such that the motor MG2 for traveling is connected to the drive shaft 36 connected to the drive wheels 39a, 39b and that the motor MG1 for power generation is connected to an output shaft of the engine 22 may be used. Furthermore, as illustrated in an electric automobile 320 of a modification example in FIG. 13, an electric automobile in which the motor MG for traveling is connected to the drive shaft 36 connected to the drive wheels 39a, 39b may be used. When the electric automobile 320 is used, the motor ECU 40 can execute the permission flag setting routines in FIG. 6 and FIG. 8 to FIG. 10 of the permission flag setting routines in FIG. 6 to FIG. 10.

The embodiment of the present disclosure is not limited to such forms of automobiles and may be embodied as a drive apparatus mounted in a moving object such as an automobile or as a drive apparatus incorporated in a facility that is not a moving object, such as a construction facility.

Correspondence between main elements of the embodiments and main elements of the present disclosure disclosed in "SUMMARY" will be described. In the embodiment, the motor MG2 corresponds to a "motor", and the inverter 42 corresponds to an "inverter". The battery 50 corresponds to an "electricity storing device", and the motor ECU 40 corresponds to an "electronic control unit".

The correspondence between the main elements of the embodiment and the main elements of the present disclosure disclosed in "SUMMARY" is one example for specific description of the embodiment for embodying the present disclosure disclosed in "SUMMARY", and thus, does not limit the elements of the present disclosure disclosed in "SUMMARY". That is, the present disclosure disclosed in "SUMMARY" is to be interpreted based on the disclosure in "SUMMARY", and the embodiment is merely one specific example of the present disclosure disclosed in "SUMMARY".

While the present disclosure is described by using the embodiment, the present disclosure is not limited to such an embodiment and may be embodied in various forms to an extent not departing from the gist of the present disclosure.

The present disclosure can be used in, for example, a manufacturing industry of drive apparatuses and automobiles.

What is claimed is:

1. A drive apparatus comprising:
    a motor;
    an inverter configured to drive the motor by switching of a plurality of switching elements;
    an electricity storing device configured to exchange electric power with the motor through the inverter; and
    an electronic control unit configured to
        control the inverter by switching between a first pulse width modulation control and a second pulse width modulation control, the first pulse width modulation control switching the switching elements by generating a first pulse width modulation signal of the switching elements by comparison of a voltage command of each phase based on a torque command of the motor with a carrier wave voltage, the second pulse width modulation control switching the switching elements by generating a second pulse width modulation signal of the switching elements based on a voltage modulation rate, a voltage phase, and the number of pulses per unit cycle of an electrical angle of the motor based on the torque command, and the number of switchings of the switching elements in the second pulse width modulation control being smaller than the number of switchings of the switching elements in the first pulse width modulation control, and
        restrict execution of the second pulse width modulation control as the control of the inverter when reduction of noise is needed in the drive apparatus, compared with when the reduction of noise is not needed.

2. The drive apparatus according to claim 1, wherein the electronic control unit permits execution of the second pulse width modulation control as the control of the inverter when the reduction of noise is not needed, and prevents execution of the second pulse width modulation control as the control of the inverter when the reduction of noise is needed.

3. The drive apparatus according to claim 2, wherein the electronic control unit executes the first pulse width modulation control as the control of the inverter at a time of a target operating point of the motor being outside a predetermined region even when execution of the second pulse width modulation control is permitted without a need for the reduction of noise.

4. The drive apparatus according to claim 1, wherein the electronic control unit in the second pulse width modulation control is configured to generate the second pulse width modulation signal of the switching elements such that a harmonic component of a desired order is reduced and that total loss of loss in the motor and loss in the inverter is reduced, compared with the first pulse width modulation control.

5. An automobile comprising:
    the drive apparatus according to claim 1; and
    drive wheels driven by being connected to the motor, wherein
    the electronic control unit is configured to determine that the reduction of noise is needed, when a vehicle speed of the automobile is lower than or equal to a predetermined vehicle speed.

6. An automobile comprising:
    the drive apparatus according to claim 1;
    drive wheels driven by being connected to the motor; and
    an engine configured to output power for traveling to the drive wheels,
    wherein the electronic control unit is configured to determine that the reduction of noise is needed, when the automobile travels without operation of the engine.

7. An automobile comprising:
    the drive apparatus according to claim 1; and
    drive wheels driven by being connected to the motor, wherein the electronic control unit is configured to determine that the reduction of noise is needed, when the number of lanes in a current location of the automobile is smaller than or equal to a predetermined number of lanes.

8. An automobile comprising:
the drive apparatus according to claim 1; and
drive wheels driven by being connected to the motor,
wherein the electronic control unit is configured to determine that the reduction of noise is needed, at night.

9. An automobile comprising:
the drive apparatus according to claim 1;
drive wheels driven by being connected to the motor;
an engine;
a power generator configured to generate electric power by using power from the engine; and
a power generator inverter configured to drive the power generator by switching of a plurality of second switching elements,
wherein the electricity storing device exchanges electric power with the motor and the power generator through the inverter and the power generator inverter,
wherein the electronic control unit is configured to control the engine and the power generator inverter such that the electricity storing device is charged with electric power generated by the power generator using power from the engine, when an electricity storage ratio of the electricity storing device is lower than or equal to a predetermined ratio at a standstill of the automobile,
wherein the electronic control unit is configured to control the power generator inverter by switching between the first pulse width modulation control and the second pulse width modulation control,
wherein the electronic control unit determines that the reduction of noise is needed, when the automobile is at a standstill, and
wherein the electronic control unit is configured to restrict execution of the second pulse width modulation control as the controls of the inverter and the power generator inverter when the reduction of noise is needed, compared with when the reduction of noise is not needed.

* * * * *